US012181810B2

(12) United States Patent
Takagi et al.

(10) Patent No.: US 12,181,810 B2
(45) Date of Patent: Dec. 31, 2024

(54) IMAGE FORMING APPARATUS

(71) Applicants: Hiroaki Takagi, Kanagawa (JP); Tomoaki Suga, Kanagawa (JP); Takahiro Konishi, Tokyo (JP)

(72) Inventors: Hiroaki Takagi, Kanagawa (JP); Tomoaki Suga, Kanagawa (JP); Takahiro Konishi, Tokyo (JP)

(73) Assignee: RICOH COMPANY, LTD., Tokyo (JP)

( * ) Notice: Subject to any disclaimer, the term of this patent is extended or adjusted under 35 U.S.C. 154(b) by 0 days.

(21) Appl. No.: 18/224,574

(22) Filed: Jul. 21, 2023

(65) Prior Publication Data

US 2024/0053695 A1 Feb. 15, 2024

(30) Foreign Application Priority Data

Aug. 10, 2022 (JP) ................................ 2022-127983

(51) Int. Cl.
*G03G 15/16* (2006.01)
*G03G 21/16* (2006.01)

(52) U.S. Cl.
CPC ....... *G03G 15/1615* (2013.01); *G03G 21/168* (2013.01); *G03G 21/1619* (2013.01)

(58) Field of Classification Search
CPC ........... G03G 15/1615; G03G 21/1619; G03G 21/1623; G03G 21/168
See application file for complete search history.

(56) References Cited

U.S. PATENT DOCUMENTS

2003/0190173 A1* 10/2003 Suzuki ............... G03G 15/1615 399/302
2004/0228653 A1 11/2004 Yoshino
(Continued)

FOREIGN PATENT DOCUMENTS

JP 2000-231271 A 8/2000
JP 2000-284638 A 10/2000
(Continued)

OTHER PUBLICATIONS

Machine Translation of JP-6326796. May 2018. (Year: 2018).*
Extended European Search Report issued Dec. 19, 2023 in European Patent Application No. 23187965.1, 8 pages.

*Primary Examiner* — Carla J Therrien
(74) *Attorney, Agent, or Firm* — XSENSUS LLP

(57) ABSTRACT

An image forming apparatus includes a photoconductor that bears an image and an intermediate transfer device that forms a primary transfer nip between the photoconductor and the intermediate transfer device. The intermediate transfer device primarily transfers the image from the photoconductor onto the intermediate transfer device at the primary transfer nip. A secondary transfer device forms a secondary transfer nip between the intermediate transfer device and the secondary transfer device. The secondary transfer device secondarily transfers the image from the intermediate transfer device onto a recording medium at the secondary transfer nip. At least one support shaft supports the intermediate transfer device. The at least one support shaft supports, on an identical axis, one lateral end and another lateral end of the secondary transfer device in a width direction of the recording medium.

14 Claims, 6 Drawing Sheets

(56) References Cited

U.S. PATENT DOCUMENTS

| | | | | |
|---|---|---|---|---|
| 2014/0140726 | A1* | 5/2014 | Fukao ................ | G03G 15/1615 399/302 |
| 2014/0241744 | A1 | 8/2014 | Ichikawa et al. | |
| 2015/0212454 | A1 | 7/2015 | Ichikawa et al. | |
| 2018/0107139 | A1 | 4/2018 | Sato | |
| 2021/0373464 | A1* | 12/2021 | Yamana ............. | G03G 15/1605 |

FOREIGN PATENT DOCUMENTS

| | | | |
|---|---|---|---|
| JP | 2013-097208 | A | 5/2013 |
| JP | 2013-250366 | A | 12/2013 |
| JP | 2014-194515 | A | 10/2014 |
| JP | 2015-102836 | A | 6/2015 |
| JP | 2015-163933 | A | 9/2015 |
| JP | 2016-177181 | A | 10/2016 |
| JP | 6326796 | B2 | 5/2018 |
| JP | 2021-189280 | A | 12/2021 |

* cited by examiner

IMAGE FORMING APPARATUS

CROSS-REFERENCE TO RELATED APPLICATION

This patent application is based on and claims priority pursuant to 35 U.S.C. § 119(a) to Japanese Patent Application No. 2022-127983, filed on Aug. 10, 2022, in the Japan Patent Office, the entire disclosure of which is hereby incorporated by reference herein.

BACKGROUND

Technical Field

Embodiments of this disclosure relate to an image forming apparatus.

Related Art

Related-art image forming apparatuses, such as copiers, facsimile machines, printers, and multifunction peripherals (MFP) having two or more of copying, printing, scanning, facsimile, plotter, and other functions, typically form an image on a recording medium according to image data by electrophotography.

Such image forming apparatuses include a transfer device that transfers a toner image formed on a photoconductor onto a recording medium such as a sheet.

For example, an image forming apparatus including a plurality of photoconductors primarily transfers toner images formed on the photoconductors, respectively, onto an intermediate transfer belt, thus forming a color toner image on the intermediate transfer belt. Subsequently, the image forming apparatus secondarily transfers the color toner image formed on the intermediate transfer belt onto a recording medium by an indirect transfer method. Hence, the image forming apparatus is installed with an intermediate transfer device that includes the intermediate transfer belt and a secondary transfer device that secondarily transfers the color toner image from the intermediate transfer belt onto the recording medium.

SUMMARY

This specification describes below an improved image forming apparatus. In one embodiment, the image forming apparatus includes a photoconductor that bears an image and an intermediate transfer device that forms a primary transfer nip between the photoconductor and the intermediate transfer device. The intermediate transfer device primarily transfers the image from the photoconductor onto the intermediate transfer device at the primary transfer nip. A secondary transfer device forms a secondary transfer nip between the intermediate transfer device and the secondary transfer device. The secondary transfer device secondarily transfers the image from the intermediate transfer device onto a recording medium at the secondary transfer nip. At least one support shaft supports the intermediate transfer device. The at least one support shaft supports, on an identical axis, one lateral end and another lateral end of the secondary transfer device in a width direction of the recording medium. The width direction is perpendicular to a recording medium conveyance direction in which the recording medium is conveyed through the secondary transfer nip.

BRIEF DESCRIPTION OF THE DRAWINGS

A more complete appreciation of embodiments of the present disclosure and many of the attendant advantages and features thereof can be readily obtained and understood from the following detailed description with reference to the accompanying drawings, wherein.

Figure 1:
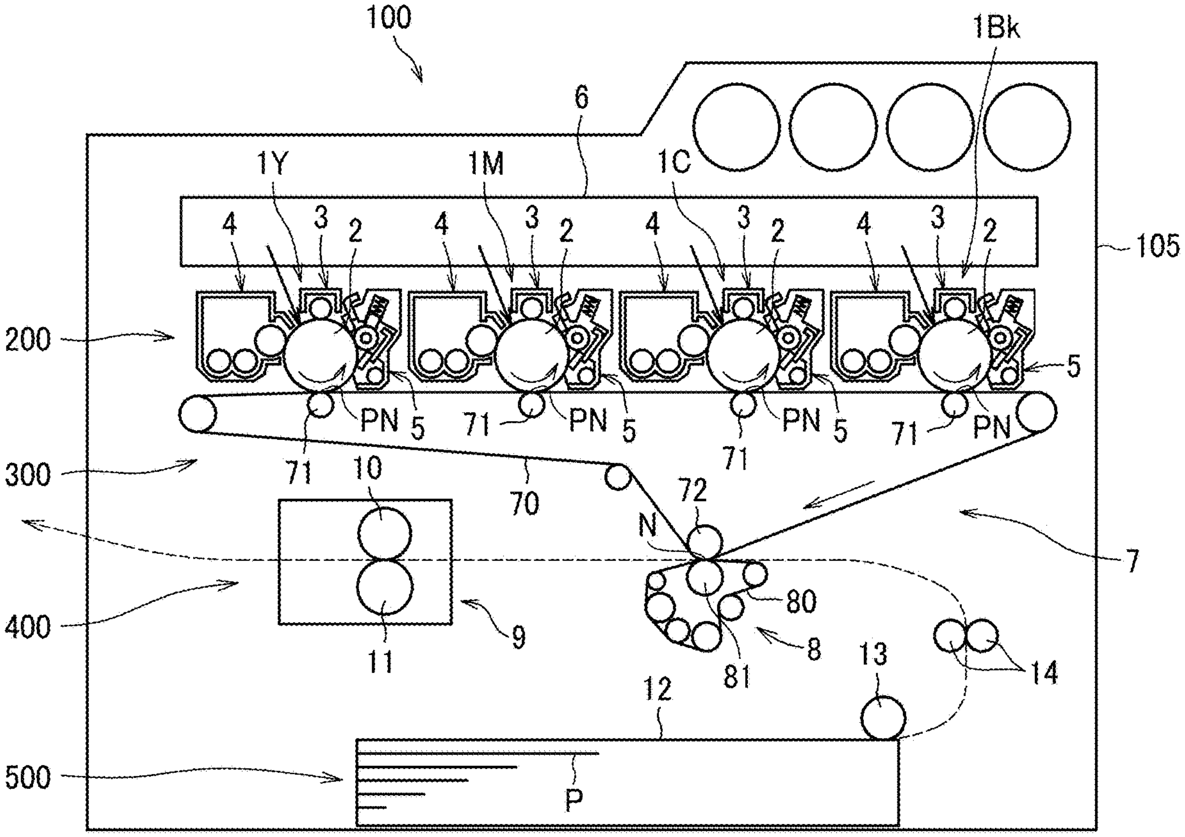
FIG. 1 is a schematic cross-sectional view of an image forming apparatus according to an embodiment of the present disclosure.

The accompanying drawings are intended to depict embodiments of the present disclosure and should not be interpreted to limit the scope thereof. The accompanying drawings are not to be considered as drawn to scale unless explicitly noted. Also, identical or similar reference numerals designate identical or similar components throughout the several views.

DETAILED DESCRIPTION

In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result.

Referring now to the drawings, embodiments of the present disclosure are described below. As used herein, the singular forms “a,” “an,” and “the” are intended to include the plural forms as well, unless the context clearly indicates otherwise.

Referring to attached drawings, the following describes embodiments of the present disclosure. In the drawings for explaining the embodiments of the present disclosure, identical reference numerals are assigned to elements such as members and parts that have an identical function or an identical shape as long as differentiation is possible and a description of the elements is omitted once the description is provided.

FIG. 1 is a schematic cross-sectional view of an image forming apparatus 100 according to an embodiment of the present disclosure. The image forming apparatus 100 is a printer. Alternatively, the image forming apparatus 100 may be a copier, a facsimile machine, a printing machine, a multifunction peripheral (MFP) having at least two of printing, copying, facsimile, scanning, and plotter functions, or the like. Image formation described below denotes forming an image having meaning such as characters and figures and an image not having meaning such as patterns.

Referring to FIG. 1, a description is provided of an overall construction and operation of the image forming apparatus 100 according to an embodiment of the present disclosure.

As illustrated in FIG. 1, the image forming apparatus 100 according to the embodiment includes an image forming portion 200, a transfer portion 300, a fixing portion 400, and a recording medium supply portion 500. The image forming portion 200 forms toner images. The transfer portion 300 transfers the toner images onto a sheet P serving as a recording medium, thus forming a color toner image on the sheet P. The fixing portion 400 fixes the color toner image on the sheet P. The recording medium supply portion 500 supplies the sheet P to the transfer portion 300.

The image forming portion 200 includes four process units 1Y, 1M, 1C, and 1Bk and an exposure device 6. The process units 1Y, 1M, 1C, and 1Bk serve as image forming units. The exposure device 6 forms an electrostatic latent image on a photoconductor 2 of each of the process units 1Y, 1M, 1C, and 1Bk.

The process units 1Y, 1M, 1C, and 1Bk basically have similar constructions, respectively. However, the process units 1Y, 1M, 1C, and 1Bk contain toners, serving as developers, in different colors, that is, yellow, magenta, cyan, and black, respectively, which correspond to color separation components for a color image. For example, each of the process units 1Y, 1M, 1C, and 1Bk includes the photoconductor 2, a charger 3, a developing device 4, and a cleaner 5. The photoconductor 2 serves as an image bearer that bears an image (e.g., an electrostatic latent image and a toner image) on a surface of the photoconductor 2. The charger 3 charges the surface of the photoconductor 2. The developing device 4 supplies the toner as the developer to the surface of the photoconductor 2 to form a toner image. The cleaner 5 cleans the surface of the photoconductor 2.

The transfer portion 300 includes an intermediate transfer device 7 and a secondary transfer device 8. The intermediate transfer device 7, serving as a primary transfer device, primarily transfers the toner images formed on the photoconductors 2, respectively, onto the intermediate transfer device 7, thus forming a color toner image. The secondary transfer device 8 secondarily transfers the color toner image from the intermediate transfer device 7 onto the sheet P.

The intermediate transfer device 7 includes an intermediate transfer belt 70, primary transfer rollers 71, and a secondary transfer backup roller 72. The intermediate transfer belt 70 is an endless belt that is stretched taut across and supported by a plurality of support rollers including the primary transfer rollers 71. Each of the primary transfer rollers 71 serves as a primary transferor that primarily transfers the toner image formed on the photoconductor 2 onto the intermediate transfer belt 70. The four primary transfer rollers 71 are disposed opposite the four photoconductors 2, respectively. The primary transfer rollers 71 are pressed against the photoconductors 2, respectively, via the intermediate transfer belt 70, thus forming primary transfer nips PN between the intermediate transfer belt 70 and the photoconductors 2.

The secondary transfer device 8 includes a secondary transfer belt 80 and a secondary transfer roller 81. The secondary transfer belt 80 is an endless belt that is stretched taut across a plurality of support rollers including the secondary transfer roller 81. The secondary transfer roller 81 serves as a secondary transferor that secondarily transfers the color toner image formed on the intermediate transfer belt 70 onto the sheet P. The secondary transfer roller 81 is disposed opposite the secondary transfer backup roller 72 that supports the intermediate transfer belt 70. The secondary transfer roller 81 is pressed against the secondary transfer backup roller 72 via the secondary transfer belt 80 and the intermediate transfer belt 70, thus forming a secondary transfer nip N between the intermediate transfer belt 70 and the secondary transfer belt 80.

The fixing portion 400 includes a fixing device 9. The fixing device 9 includes a fixing rotator 10 and a pressure rotator 11. The fixing device 9 further includes a heater that heats the fixing rotator 10. The pressure rotator 11 is disposed opposite the fixing rotator 10. The fixing rotator 10 and the pressure rotator 11 contact each other to form a fixing nip therebetween.

The recording medium supply portion 500 includes a sheet tray 12 (e.g., a paper tray) and a feed roller 13. The sheet tray 12 loads a plurality of sheets P serving as recording media. The feed roller 13 picks up and feeds a sheet P from the sheet tray 12. The image forming apparatus 100 further includes a timing roller pair 14. According to the embodiments below, a sheet (e.g., a sheet P) is used as a recording medium. However, the recording medium is not limited to paper as the sheet. In addition to paper as the sheet, the recording media include an overhead projector (OHP) transparency, cloth, a metal sheet, plastic film, and a prepreg sheet pre-impregnated with resin in carbon fibers. In addition to plain paper, the sheets include thick paper, a postcard, an envelope, thin paper, coated paper, art paper, and tracing paper.

Referring to FIG. 1, a description is provided of printing processes performed by the image forming apparatus 100 according to the embodiment.

When the image forming apparatus 100 receives an instruction to start printing, a driver starts driving and rotating the photoconductor 2 of each of the process units 1Y, 1M, 1C, and 1Bk counterclockwise in FIG. 1 and the intermediate transfer belt 70 of the intermediate transfer device 7 clockwise in FIG. 1. The feed roller 13 starts rotation, feeding a sheet P from the sheet tray 12. As the sheet P fed by the feed roller 13 comes into contact with the timing roller pair 14, the timing roller pair 14 temporarily halts the sheet P. Thus, the timing roller pair 14 temporarily interrupts conveyance of the sheet P until the toner image, that is to be transferred onto the sheet P, is formed on the intermediate transfer belt 70.

The charger 3 of each of the process units 1Y, 1M, 1C, and 1Bk charges the surface of the photoconductor 2 evenly at a high electric potential. The exposure device 6 exposes the charged surfaces of the photoconductors 2, respectively, according to image data sent from a terminal. Alternatively, if the image forming apparatus 100 is a copier, the exposure device 6 exposes the charged surfaces of the photoconductors 2, respectively, according to image data created by a scanner that reads an image on an original. Accordingly, the electric potential of an exposed portion on the surface of each of the photoconductors 2 decreases, forming an electrostatic latent image on the surface of each of the photoconductors 2. The developing device 4 of each of the process units 1Y, 1M, 1C, and 1Bk supplies toner to the electrostatic latent image formed on the photoconductor 2, forming a toner image thereon. When the toner images formed on the photoconductors 2 reach the primary transfer nips PN defined by the primary transfer rollers 71 in accordance with rotation of the photoconductors 2, respectively, the primary transfer rollers 71 transfer the toner images formed on the photoconductors 2 onto the intermediate transfer belt 70 driven and rotated clockwise in FIG. 1 successively such that the toner images are superimposed on the intermediate transfer belt 70. Thus, the superimposed toner images form a full color toner image on the intermediate transfer belt 70. Alternatively, one of the four process units 1Y, 1M, 1C, and 1Bk may be used to form a monochrome toner image or two or three of the four process units 1Y, 1M, 1C, and 1Bk may be used to form a bicolor toner image or a tricolor toner image. After the toner image formed on the photoconductor 2 is transferred onto the intermediate transfer belt 70, the cleaner 5 removes residual toner and the like remaining on the photoconductor 2 therefrom.

The full color toner image formed on the intermediate transfer belt 70 is conveyed to the secondary transfer nip N defined by the secondary transfer roller 81 in accordance with rotation of the intermediate transfer belt 70 and is transferred onto the sheet P conveyed by the timing roller pair 14. Thereafter, the sheet P is conveyed to the fixing device 9 where the sheet P passes through the fixing nip formed between the fixing rotator 10 and the pressure rotator 11. While the sheet P passes through the fixing nip, the fixing rotator 10 and the pressure rotator 11 fix the full color toner image on the sheet P under heat and pressure. Thereafter, the sheet P is ejected onto an outside of a body 105 of the image forming apparatus 100. Thus, a series of printing processes is finished.

Figure 2:
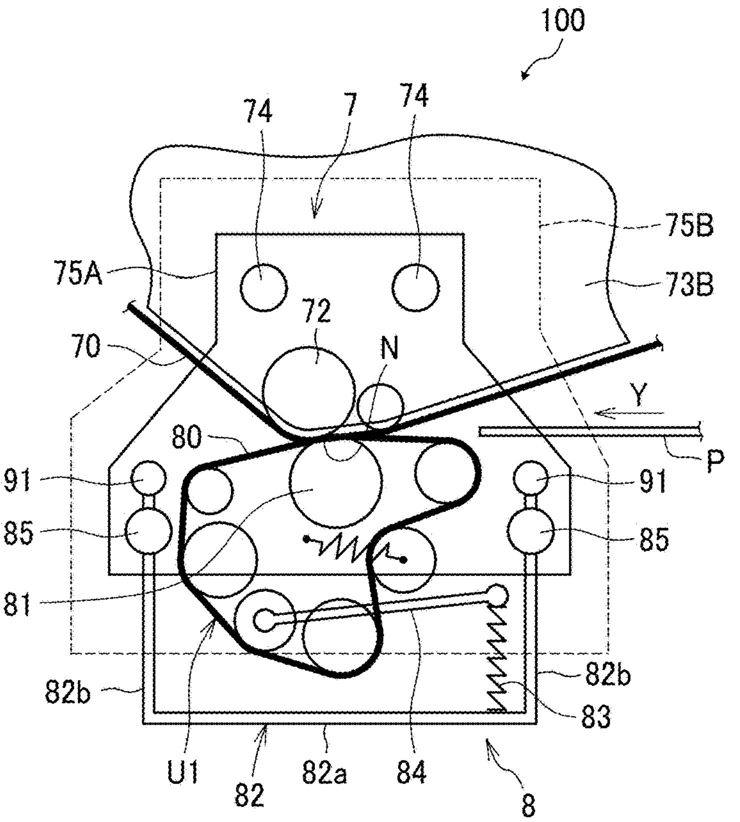
FIG. 2 is a diagram of the image forming apparatus according to a first embodiment of the present disclosure, illustrating an intermediate transfer device and a secondary transfer device incorporated in the image forming apparatus depicted in FIG. 1, seen from one lateral end of the intermediate transfer device and the secondary transfer device in a width direction of a recording medium.
Figure 3:
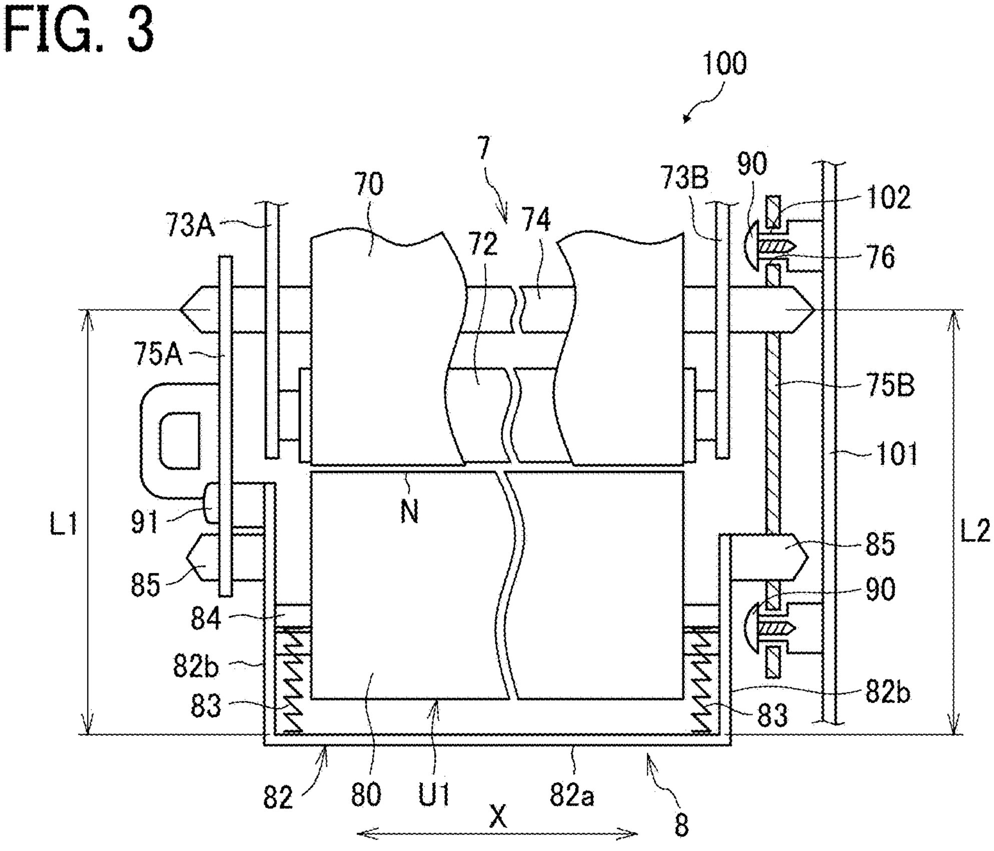
FIG. 3 is a diagram of the intermediate transfer device and the secondary transfer device depicted in FIG. 2, seen from an upstream position upstream from a secondary transfer nip in a recording medium conveyance direction in which the recording medium is conveyed.

Referring to FIGS. 2 and 3, a description is provided of a construction of the intermediate transfer device 7 and the secondary transfer device 8 of the image forming apparatus 100 according to a first embodiment of the present disclosure.

FIG. 2 is a diagram of the intermediate transfer device 7 and the secondary transfer device 8, seen from one lateral end of the sheet P in a width direction thereof when the sheet P passes through the secondary transfer nip N. FIG. 3 is a diagram of the intermediate transfer device 7 and the secondary transfer device 8, seen from an upstream position upstream from the secondary transfer nip N in a sheet conveyance direction Y depicted in FIG. 2 in which the sheet P is conveyed. The width direction of the sheet P denotes a width direction X depicted in FIG. 3 that is perpendicular to the sheet conveyance direction Y depicted in FIG. 2 within a surface of the sheet P that is conveyed. The width direction of the sheet P is parallel to an axial direction of the secondary transfer roller 81 or the secondary transfer backup roller 72. The width direction of the sheet P is referred to as the width direction for convenience in a description below.

As illustrated in FIG. 3, the intermediate transfer device 7 according to the embodiment includes a pair of frames 73A and 73B arranged with a clearance therebetween in the width direction X of the sheet P. The frames 73A and 73B rotatably mount both lateral ends of the support rollers such as the secondary transfer backup roller 72 in the width direction X of the sheet P, respectively. As illustrated in FIG. 2, the intermediate transfer device 7 is provided with two penetrating shafts 74 serving as positioners and support shafts, respectively. Each of the penetrating shafts 74 extends horizontally and penetrates through the pair of frames 73A and 73B. The image forming apparatus 100 further includes a front plate 75A and a rear plate 75B that are disposed outboard from the frames 73A and 73B, respectively, in the width direction X of the sheet P. Each of the penetrating shafts 74 also penetrates through the front plate 75A and the rear plate 75B.

As described above, the intermediate transfer device 7 according to the embodiment is provided with the penetrating shafts 74 each of which penetrates through the pair of frames 73A and 73B of the intermediate transfer device 7. Each of the penetrating shafts 74 also penetrates through the front plate 75A and the rear plate 75B. Thus, the intermediate transfer device 7 is positioned with respect to the front plate 75A and the rear plate 75B through the penetrating shafts 74. For example, the penetrating shafts 74 position the intermediate transfer device 7 with respect to the front plate 75A and the rear plate 75B in an orthogonal direction perpendicular to an axial direction of each of the penetrating shafts 74.

As illustrated in FIG. 3, the image forming apparatus 100 further includes a rear body plate 101 and fasteners 90. The rear body plate 101 serves as a frame of the body 105 of the image forming apparatus 100. The fasteners 90 such as screws fasten the rear plate 75B to the rear body plate 101. For example, the image forming apparatus 100 further includes a projection 102 that projects from the rear body plate 101. The projection 102 penetrates through a hole 76 of the rear plate 75B. As each of the fasteners 90 is coupled with a tip of the projection 102 penetrating through the hole 76, the fastener 90 fastens the rear plate 75B to the rear body plate 101. According to the embodiment, in order to prevent deformation of the rear plate 75B when the rear plate 75B is attached to the rear body plate 101 and improve detachment of the rear plate 75B from the rear body plate 101, a clearance is provided between the projection 102 and the hole 76 so that the rear plate 75B is displaced slightly with respect to the rear body plate 101.

The secondary transfer device 8 according to the embodiment includes a secondary transfer unit U1, a base 82, and pressure springs 83. The secondary transfer unit U1 includes the secondary transfer belt 80. The base 82 serves as a holder that holds the secondary transfer unit U1. Each of the pressure springs 83 serves as a biasing member that biases the secondary transfer unit U1 against the intermediate transfer device 7. In addition to the secondary transfer belt 80, the secondary transfer unit U1 includes the support rollers, such as the secondary transfer roller 81 depicted in FIG. 2, that support the secondary transfer belt 80.

The base 82 includes a bottom face 82*a* and side faces 82*b* that extend upward from the bottom face 82*a*. The side faces 82*b* of the base 82 rotatably mount both lateral ends of the support rollers including the secondary transfer roller 81 depicted in FIG. 2 in the width direction X of the sheet P, respectively. The pressure springs 83 are anchored to the bottom face 82*a* of the base 82. As illustrated in FIG. 2, the secondary transfer device 8 further includes pressure levers 84 that are biased upward by the pressure springs 83, respectively. The pressure levers 84 pivot about a single support roller other than the secondary transfer roller 81. As the pressure springs 83 bias the pressure levers 84 upward, respectively, the pressure levers 84 lift an entirety of the secondary transfer unit U1 toward the intermediate transfer device 7. Accordingly, the secondary transfer roller 81 is pressed against the secondary transfer backup roller 72 via the secondary transfer belt 80 and the intermediate transfer belt 70, thus forming the secondary transfer nip N between the secondary transfer belt 80 and the intermediate transfer belt 70. According to the embodiment, the single pressure spring 83 is disposed at one lateral end and another lateral end of the secondary transfer device 8 in the width direction X of the sheet P.

As illustrated in FIGS. 2 and 3, the base 82 is coupled with the penetrating shafts 74 through the front plate 75A and the rear plate 75B. That is, according to the embodiment, each of the front plate 75A and the rear plate 75B serves as a coupler that couples the base 82 with the penetrating shafts 74. For example, according to the embodiment, the side faces 82*b* are disposed at one lateral end and another lateral end of the base 82 in the width direction X of the sheet P, respectively. Each of the side faces 82*b* mounts two positioning projections 85 that are pins that project horizontally. The positioning projections 85 penetrate through the front plate 75A and the rear plate 75B, respectively, thus coupling the base 82 with the front plate 75A and the rear plate 75B. Accordingly, the base 82 is positioned with respect to the front plate 75A and the rear plate 75B in an orthogonal direction perpendicular to the width direction X (e.g., a projecting direction in which the positioning projections 85 project).

The image forming apparatus 100 according to the embodiment further includes securing members 91 such as screws that secure the base 82 to the front plate 75A. Hence, the front plate 75A, together with the secondary transfer device 8, is moved leftward in FIG. 3 and removed from the body 105 of the image forming apparatus 100. For example, when the secondary transfer device 8 is moved in a removal direction in which the secondary transfer device 8 is removed from the body 105 of the image forming apparatus 100, the front plate 75A is moved in accordance with motion of the secondary transfer device 8 and is detached from the penetrating shafts 74. The secondary transfer device 8, that mounts the positioning projection 85 (e.g., the right positioning projection 85 in FIG. 3 or the rear positioning projection 85) penetrating through the rear plate 75B, is detached from the rear plate 75B. As described above, according to the embodiment, the secondary transfer device 8 is removably installed in the body 105 of the image forming apparatus 100 or detachably attached to the rear plate 75B. Accordingly, if the sheet P is jammed at the secondary transfer nip N or when an operator (e.g., a user or a service engineer) performs maintenance on the secondary transfer device 8, for example, the operator removes the secondary transfer device 8. Thus, the operator removes the jammed sheet P from the secondary transfer nip N or performs maintenance readily.

A description is provided of a construction of a comparative image forming apparatus incorporating an intermediate transfer device and a secondary transfer device.

The secondary transfer device includes a secondary transfer roller that contacts an intermediate transfer belt to form a secondary transfer nip therebetween. As a sheet passes through the secondary transfer nip, the secondary transfer roller transfers a toner image formed on the intermediate transfer belt onto the sheet.

In order to form the secondary transfer nip, biasing members such as springs bias the secondary transfer device against the intermediate transfer device. Thus, the biasing members hold the secondary transfer device in a state in which the secondary transfer roller is pressed against the intermediate transfer belt. At least a part of a reactive force applied from the intermediate transfer device to the secondary transfer device is received by a support of the intermediate transfer device, that supports the secondary transfer device.

However, in the secondary transfer device, a position of the support that supports the secondary transfer device is shifted between one lateral end and another lateral end of the secondary transfer device in a width direction of the sheet that passes through the secondary transfer nip, generating variation in an amount of deformation such as a bend of the secondary transfer device, that is caused by pressure or a reactive force against the pressure. Accordingly, the secondary transfer nip may suffer from uneven pressure. To address the circumstance, adjustment of pressure is requested to eliminate uneven pressure.

Figure 11:
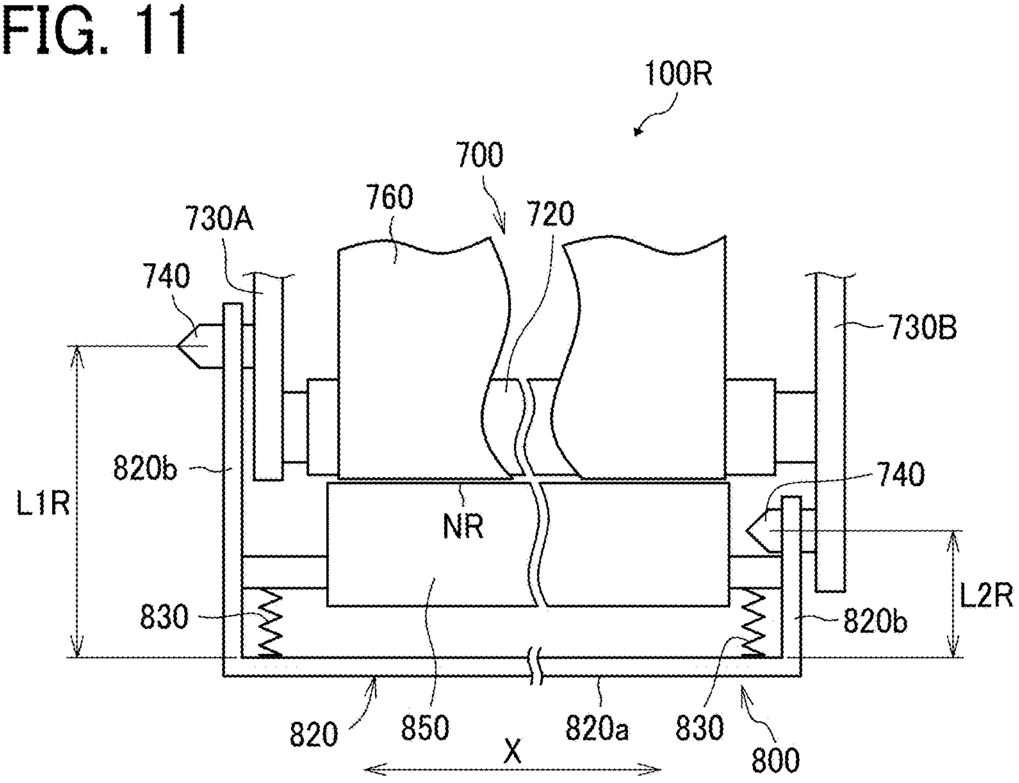
FIG. 11 is a diagram of an image forming apparatus according to a comparative example, illustrating an intermediate transfer device and a secondary transfer device incorporated therein, seen from an upstream position upstream from a secondary transfer nip in a recording medium conveyance direction in which a recording medium is conveyed.

Referring to FIG. 11, a description is provided of a construction of an image forming apparatus 100R according to a comparative example that is different from the construction of the image forming apparatus 100 according to the embodiment of the present disclosure described above.

As illustrated in FIG. 11, the image forming apparatus 100R according to the comparative example includes a secondary transfer device 800, an intermediate transfer device 700 including an intermediate transfer belt 760, a secondary transfer backup roller 720, and a pair of frames 730A and 730B, and support shafts 740. The frames 730A and 730B support the intermediate transfer belt 760, the secondary transfer backup roller 720, and the like of the intermediate transfer device 700. The support shafts 740 mounted on the frames 730A and 730B support the secondary transfer device 800. For example, the secondary transfer device 800 includes a base 820 and a secondary transfer belt 850. The base 820 holds the secondary transfer belt 850 and the like. The support shafts 740 support the base 820 at one lateral end and another lateral end of the base 820 in the width direction X of the sheet P, respectively. The base 820 includes a bottom face 820*a* and side faces 820*b* that extend upward from the bottom face 820*a*. The side faces 820*b* are coupled with the support shafts 740 at one lateral end and another lateral end of the base 820 in the width direction X of the sheet P, respectively.

The secondary transfer device 800 further includes pressure springs 830 that are anchored to the bottom face 820*a* of the base 820. The pressure springs 830 press the secondary transfer belt 850 against the intermediate transfer device 700, thus forming a secondary transfer nip NR between the secondary transfer device 800 and the intermediate transfer device 700. For example, like in the embodiment described above, the pressure springs 830 lift the secondary transfer belt 850 and a secondary transfer roller and the like that support the secondary transfer belt 850. Accordingly, the secondary transfer belt 850 contacts the intermediate transfer belt 760, forming the secondary transfer nip NR therebetween.

The base 820 is exerted with a reactive force in a direction opposite to a lifting direction in which the pressure springs 830 lift the secondary transfer belt 850. Hence, the pressure springs 830 press the base 820 downward in FIG. 11. The reactive force that presses the base 820 downward is transmitted from the bottom face 820*a* to the side faces 820*b*. Accordingly, as the reactive force is transmitted to the side face 820*b*, a lower portion of the side face 820*b*, that is disposed below a supported portion of the side face 820*b*, that is supported by the support shaft 740, may be deformed and stretched downward.

However, according to the comparative example, a position of the support shaft 740 disposed at one lateral end of the base 820 in the width direction X of the sheet P is vertically shifted from a position of the support shaft 740 disposed at another lateral end of the base 820 in the width direction X of the sheet P, generating variation in a stretch amount of the side faces 820*b* that are stretched by the reactive force. For example, according to the comparative example, a distance L1R from a support position (e.g., a position of the support shaft 740) at which the support shaft 740 supports the secondary transfer device 800 to an exertion position (e.g., a position of the bottom face 820*a*) at which the bottom face 820*a* is exerted with a biasing force (e.g., a reactive force) from the pressure spring 830 at one lateral end of the base 820 in the width direction X of the sheet P is vertically different from a distance L2R from a support position (e.g., a position of the support shaft 740) at which the support shaft 740 supports the secondary transfer device 800 to an exertion position (e.g., a position of the bottom face 820*a*) at which the bottom face 820*a* is exerted with a biasing force (e.g., a reactive force) from the pressure spring 830 at another lateral end of the base 820 in the width direction X of the sheet P. That is, the distance L1R is greater than the distance L2R in a direction perpendicular to the width direction X of the sheet P. Even if the pressure springs 830 apply an identical biasing force, a stretch amount of the side face 820*b* disposed at one lateral end of the base 820 in the width direction X of the sheet P may be different from a stretch amount of the side face 820*b* disposed at another lateral end of the base 820 in the width direction X of the sheet P. As a result, a posture of the bottom face 820*a* of the base 820 is changed and inclined. Accordingly, the secondary transfer nip NR may suffer from variation in pressure (e.g., uneven pressure). The uneven pressure at the secondary transfer nip NR may cause faulty image transfer. Hence, adjustment of the biasing force is requested between the pressure springs 830 disposed at one lateral end and another lateral end of the base 820 in the width direction X of the sheet P, respectively.

To address the circumstance of the comparative example, according to the embodiment of the present disclosure described above, as illustrated in FIG. 3, the penetrating shafts 74 that are linear and penetrate through the intermediate transfer device 7 serve as the support shafts that support the secondary transfer device 8. Hence, an identical shaft, that is, the penetrating shaft 74, supports the secondary transfer device 8 at one lateral end and another lateral end of the secondary transfer device 8 in the width direction X of the sheet P. For example, according to the embodiment of the present disclosure, unlike the comparative example described above, the penetrating shaft 74, serving as the support shaft that defines an identical axis, supports the secondary transfer device 8 at one lateral end and another lateral end of the secondary transfer device 8 in the width direction X of the sheet P.

As described above, according to the embodiment of the present disclosure, the penetrating shaft 74, serving as the support shaft that defines the identical axis and supports the intermediate transfer device 7, supports the secondary transfer device 8 at one lateral end and another lateral end of the secondary transfer device 8 in the width direction X of the sheet P. Accordingly, as illustrated in FIG. 3, a distance L1 from a support position (e.g., a position of the penetrating shaft 74) at which the penetrating shaft 74 supports the secondary transfer device 8 to an exertion position (e.g., a position of the bottom face 82*a*) at which the bottom face 82*a* is exerted with a biasing force (e.g., a reactive force) from the pressure spring 83 at one lateral end of the base 82 in the width direction X of the sheet P equals vertically (e.g., in the orthogonal direction perpendicular to the width direction X of the sheet P) to a distance L2 from a support position (e.g., a position of the penetrating shaft 74) at which the penetrating shaft 74 supports the secondary transfer device 8 to an exertion position (e.g., a position of the bottom face 82*a*) at which the bottom face 82*a* is exerted with a biasing force (e.g., a reactive force) from the pressure spring 83 at another lateral end of the base 82 in the width direction X of the sheet P. That is, the distance L1 equals to the distance L2 in the direction perpendicular to the width direction X of the sheet P.

Accordingly, the penetrating shafts 74 decrease variation in a stretch amount of the base 82 and the like that are stretched by the biasing force (e.g., the reactive force) from the pressure springs 83 between one lateral end and another lateral end of the base 82 in the width direction X of the sheet P. For example, according to the embodiment of the present disclosure, the penetrating shafts 74 decrease unevenness between a stretch amount of the side face 82*b* of the base 82 and the front plate 75A within the distance L1 and a stretch amount of the side face 82*b* of the base 82 and the rear plate 75B within the distance L2. As a result, according to the embodiment of the present disclosure, the penetrating shafts 74 prevent inclination of the bottom face 82*a* of the base 82, suppressing uneven pressure applied at the secondary transfer nip N throughout an entirety of the secondary transfer nip N in the width direction X of the sheet P. The penetrating shafts 74 that suppress uneven pressure applied at the secondary transfer nip N also eliminate adjustment of the biasing force between the pressure springs 83 disposed at one lateral end and another lateral end of the base 82 in the width direction X of the sheet P, thus decreasing a load imposed on the operator.

According to the embodiment of the present disclosure described above, the penetrating shaft 74, that is, the identical shaft, serves as the support shaft that supports the secondary transfer device 8. Thus, the penetrating shaft 74 serves as the support shaft that improves accuracy in positioning of an axis at one lateral end of the penetrating shaft 74 relative to an axis at another lateral end of the penetrating shaft 74 in the width direction X of the sheet P. However, the support shaft that supports the secondary transfer device 8 is not limited to the penetrating shaft 74 as the identical shaft. Alternatively, separate shafts mounted on the frames 73A and 73B of the intermediate transfer device 7, respectively, may be employed as the support shafts as long as the separate shafts define an identical axis.

According to the embodiments of the present disclosure, the identical axis defines a configuration in which a center of the support shaft is disposed on the identical axis at one lateral end and another lateral end of the secondary transfer device 8 in the width direction X of the sheet P. Additionally, the identical axis also defines a configuration in which shifting is caused by a machining error, an installation error, or the like. For example, the support shaft that supports the secondary transfer device 8 may have centers that are shifted from each other within an error of plus or minus 3 mm.

According to the embodiment described above, as illustrated in FIG. 2, the two penetrating shafts 74, that is, an upstream penetrating shaft and a downstream penetrating shaft, are arranged in the sheet conveyance direction Y. However, the number of the penetrating shafts 74 is not limited to two. For example, the number of the penetrating shafts 74 may be three or more. Alternatively, the single penetrating shaft 74 may be employed, as long as the single penetrating shaft 74 supports the secondary transfer device 8 safely.

According to the embodiment described above, the base 82 of the secondary transfer device 8 is coupled with the penetrating shaft 74 indirectly through the front plate 75A and the rear plate 75B. Alternatively, the side faces 82*b* of the base 82 may be combined with the front plate 75A and the rear plate 75B, respectively, such that the side faces 82*b* of the base 82 are coupled with the penetrating shaft 74 serving as the support shaft directly.

According to the embodiment described above, the base 82 is coupled with the penetrating shafts 74 indirectly through the front plate 75A and the rear plate 75B. Hence, as the biasing force (e.g., the reactive force) from the pressure springs 83 press the base 82 downward in FIG. 3, at least a part of the biasing force (e.g., the reactive force) is received by the penetrating shafts 74 that support the secondary transfer device 8. Additionally, at least a part of the biasing force is received by the positioning projections 85 that position the secondary transfer device 8 with respect to the front plate 75A and the rear plate 75B or the securing members 91 that secure the secondary transfer device 8 to the front plate 75A and the rear plate 75B.

However, if the penetrating shafts 74, the positioning projections 85, and the securing members 91 that receive the biasing force (e.g., the reactive force) are not arranged with a proper balance, the secondary transfer device 8 may have an unstable posture, degrading adjustment of pressure at the secondary transfer nip N. For example, if the penetrating shafts 74, the positioning projections 85, or the securing members 91 that receive the biasing force concentrate in a left part in FIG. 2 of the intermediate transfer device 7 and the secondary transfer device 8, that is disposed downstream from the secondary transfer nip N in the sheet conveyance direction Y, the secondary transfer device 8 receives the biasing force (e.g., the reactive force) from the pressure springs 83 and rotates counterclockwise in FIG. 2. Accordingly, the secondary transfer device 8 may have an unstable posture.

To address the circumstance, the penetrating shafts 74, the positioning projections 85, and the securing members 91 that receive the biasing force are preferably arranged with respect to the secondary transfer nip N with a proper balance.

Figure 4:
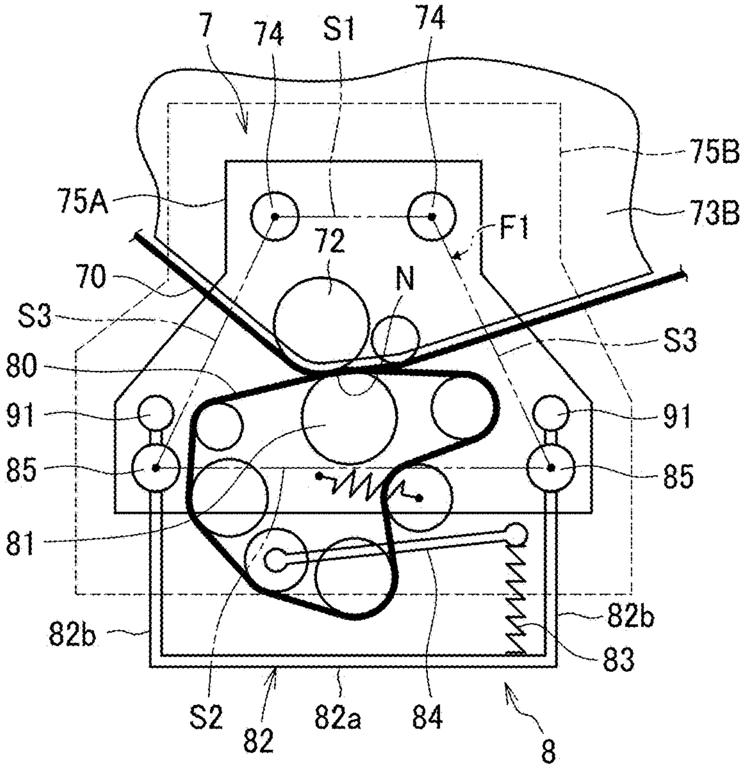
FIG. 4 is a diagram of the intermediate transfer device and the secondary transfer device depicted in FIG. 2, illustrating an arrangement of elements that receive a biasing force from a pressure spring with respect to the secondary transfer nip.

For example, as illustrated in FIG. 4, when seen from one lateral end or another lateral end of the intermediate transfer device 7 and the secondary transfer device 8 in the width direction X of the sheet P, the penetrating shafts 74 define a straight line S1 that links the penetrating shafts 74 serving as the support shafts. The positioning projections 85 define a straight line S2 that links the positioning projections 85 serving as coupled portions coupled with the front plate 75A and the rear plate 75B. Each of the penetrating shafts 74 and each of the positioning projections 85 define a straight line S3 that links the penetrating shaft 74 and the positioning projection 85. The straight lines S1, S2, and S3 define a hypothetical frame F1 (e.g., a trapezoidal frame) as illustrated in FIG. 4. The secondary transfer nip N is preferably disposed within or surrounded by the hypothetical frame F1. Accordingly, the penetrating shafts 74 and the positioning projections 85, that are disposed at one lateral end and another lateral end of the intermediate transfer device 7 and the secondary transfer device 8, respectively, and sandwich the secondary transfer nip N in the width direction X of the sheet P as illustrated in FIG. 3, receive the biasing force (e.g., the reactive force) from the pressure springs 83 with a proper balance. Consequently, the secondary transfer device 8 attains a stable posture, facilitating adjustment of pressure at the secondary transfer nip N.

Figure 5:
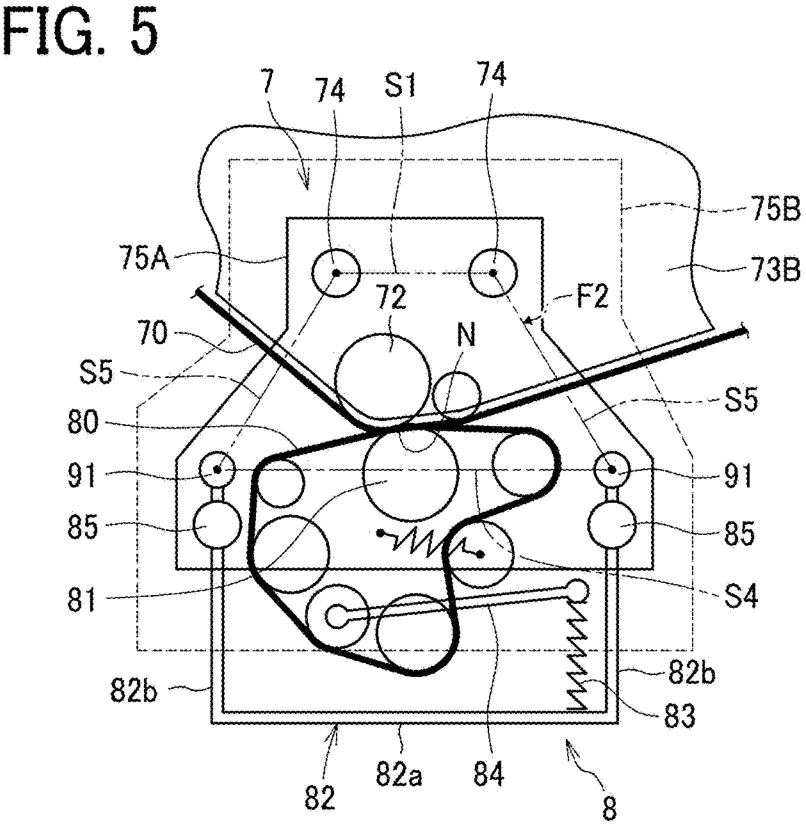
FIG. 5 is a diagram of the intermediate transfer device and the secondary transfer device depicted in FIG. 2, illustrating another arrangement of the elements that receive the biasing force from the pressure spring with respect to the secondary transfer nip.

As illustrated in FIG. 5, when seen from one lateral end or another lateral end of the intermediate transfer device 7 and the secondary transfer device 8 in the width direction X of the sheet P, the penetrating shafts 74 define the straight line S1 that links the penetrating shafts 74. The securing members 91 define a straight line S4 that links the securing members 91 serving as another coupled portions coupled with the front plate 75A and the rear plate 75B. Each of the penetrating shafts 74 and each of the securing members 91 define a straight line S5 that links the penetrating shaft 74 and the securing member 91. The straight lines S1, S4, and S5 define a hypothetical frame F2 (e.g., a trapezoidal frame) as illustrated in FIG. 5. The secondary transfer nip N is disposed within or surrounded by the hypothetical frame F2. In this case also, the penetrating shafts 74 and the securing members 91, that are disposed at one lateral end and another lateral end of the intermediate transfer device 7 and the secondary transfer device 8, respectively, and sandwich the secondary transfer nip N in the width direction X of the sheet P as illustrated in FIG. 3, receive the biasing force (e.g., the reactive force) from the pressure springs 83 with a proper balance. Accordingly, the secondary transfer device 8 attains a stable posture, facilitating adjustment of pressure at the secondary transfer nip N.

Figure 6:
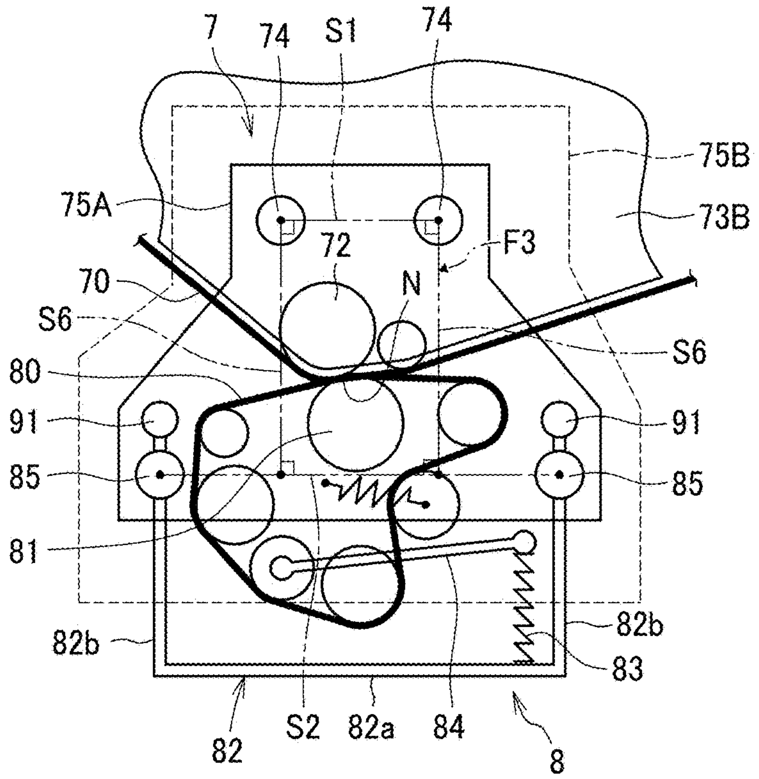
FIG. 6 is a diagram of the intermediate transfer device and the secondary transfer device depicted in FIG. 2, illustrating yet another arrangement of the elements that receive the biasing force from the pressure spring with respect to the secondary transfer nip.

In order to attain the stable posture of the secondary transfer device 8, as illustrated in FIG. 6, when seen from one lateral end or another lateral end of the intermediate transfer device 7 and the secondary transfer device 8 in the width direction X of the sheet P, the penetrating shafts 74 define the straight line S1 that links the penetrating shafts 74. The positioning projections 85 define the straight line S2 that links the positioning projections 85. Each of the penetrating shafts 74 defines a straight line S6 that vertically extends downward in FIG. 6. The straight lines S1, S2, and S6 define a hypothetical frame F3 (e.g., a rectangular frame) as illustrated in FIG. 6. The secondary transfer nip N is more preferably disposed within or surrounded by the hypothetical frame F3. Accordingly, the secondary transfer device 8 improves a stable posture, facilitating adjustment of pressure at the secondary transfer nip N further.

Figure 7:
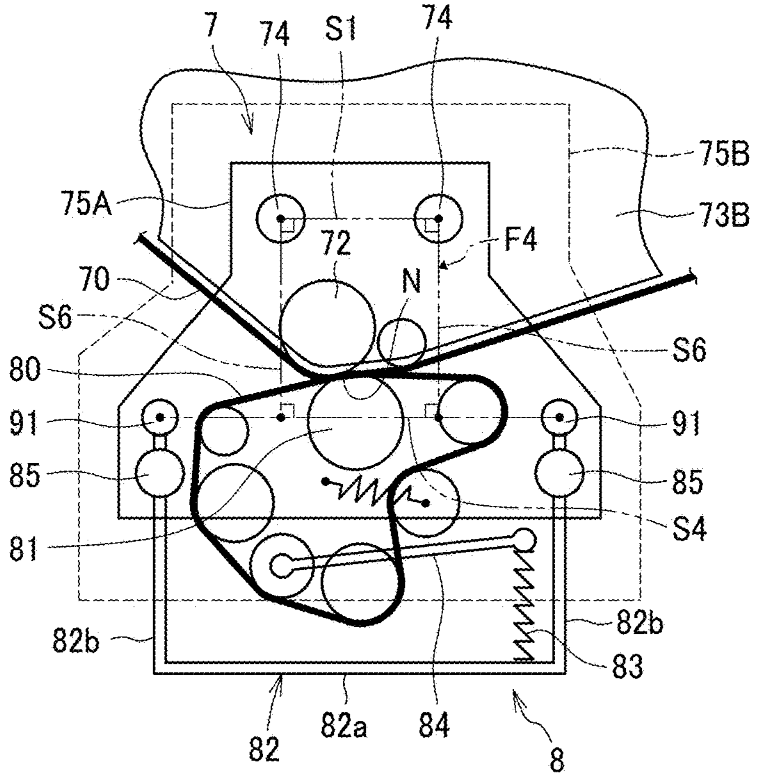
FIG. 7 is a diagram of the intermediate transfer device and the secondary transfer device depicted in FIG. 2, illustrating yet another arrangement of the elements that receive the biasing force from the pressure spring with respect to the secondary transfer nip.

As illustrated in FIG. 7, when seen from one lateral end or another lateral end of the intermediate transfer device 7 and the secondary transfer device 8 in the width direction X of the sheet P, the penetrating shafts 74 define the straight line S1 that links the penetrating shafts 74. The securing members 91 define the straight line S4 that links the securing members 91. Each of the penetrating shafts 74 defines the straight line S6 that vertically extends downward in FIG. 7. The straight lines S1, S4, and S6 define a hypothetical frame F4 (e.g., a rectangular frame) as illustrated in FIG. 7. The secondary transfer nip N is disposed within or surrounded by the hypothetical frame F4. In this case also, the secondary transfer device 8 improves a stable posture, facilitating adjustment of pressure at the secondary transfer nip N further.

A description is provided of embodiments of the present disclosure, that are different from the first embodiment described above. The embodiments are described mainly of constructions that are different from the construction of the first embodiment described above. A description of the constructions that are common to the first embodiment described above is omitted properly.

Figure 8:
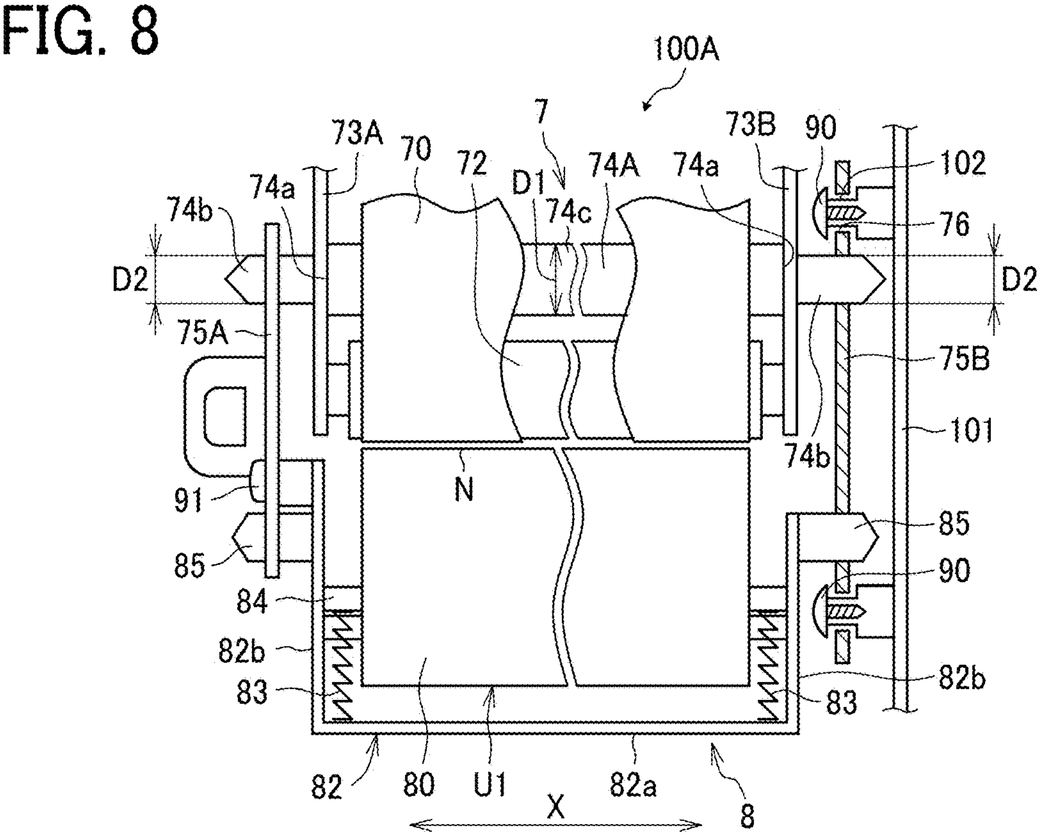
FIG. 8 is a diagram of an image forming apparatus according to a second embodiment of the present disclosure, illustrating the intermediate transfer device and the secondary transfer device incorporated therein, seen from the upstream position upstream from the secondary transfer nip in the recording medium conveyance direction.

FIG. 8 is a diagram of an image forming apparatus 10A incorporating the intermediate transfer device 7 and the secondary transfer device 8 according to a second embodiment of the present disclosure, seen from the upstream position upstream from the secondary transfer nip N in the sheet conveyance direction Y in which the sheet P is conveyed.

The intermediate transfer device 7 according to the second embodiment illustrated in FIG. 8 is provided with a penetrating shaft 74A that includes lateral end portions 74*b* and a center portion 74*c*. The lateral end portions 74*b* support the secondary transfer device 8. The center portion 74*c* is interposed between the lateral end portions 74*b* in the width direction X of the sheet P. The center portion 74*c* is thicker than each of the lateral end portions 74*b*. For example, a diameter D1 of the center portion 74*c* is greater than a diameter D2 of each of the lateral end portions 74*b*. Elements of the image forming apparatus 100A, that are other than the penetrating shaft 74A, are identical to the elements of the image forming apparatus 100 according to the first embodiment described above.

As described above, the center portion 74*c* of the penetrating shaft 74A is thicker than each of the lateral end portions 74*b*. Hence, the penetrating shaft 74A reduces bends caused by the biasing force (e.g., the reactive force) from the pressure springs 83. Accordingly, the pressure springs 83 apply pressure to the secondary transfer nip N effectively throughout the entirety of the secondary transfer nip N in the width direction X of the sheet P. Consequently, the penetrating shaft 74A suppresses uneven pressure applied at the secondary transfer nip N precisely.

The lateral end portions 74*b* that are thinner than the center portion 74*c* facilitate machining accuracy of the penetrating shaft 74A. Thus, the lateral end portions 74*b* that support the secondary transfer device 8 improve machining accuracy, improving accuracy in positioning the secondary transfer device 8 in an orthogonal direction perpendicular to an axial direction of the penetrating shaft 74A. Additionally, improvement in machining accuracy is performed for the lateral end portions 74*b*, reducing manufacturing costs.

The penetrating shaft 74A further includes a step 74*a* that is interposed between the lateral end portion 74*b* (e.g., a thin portion) and the center portion 74*c* (e.g., a thick portion). The step 74*a* serves as a positioner that positions each of the frames 73A and 73B with respect to the penetrating shaft 74A. For example, in order to install each of the frames 73A and 73B from the lateral end portion 74*b* of the penetrating shaft 74A in the axial direction thereof, as each of the frames 73A and 73B comes into contact with the step 74*a* of the penetrating shaft 74A, the step 74*a* positions each of the frames 73A and 73B with respect to the penetrating shaft 74A in the axial direction thereof. Thus, the step 74*a* improves accuracy in attachment of each of the frames 73A and 73B to the penetrating shaft 74A.

Figure 9:
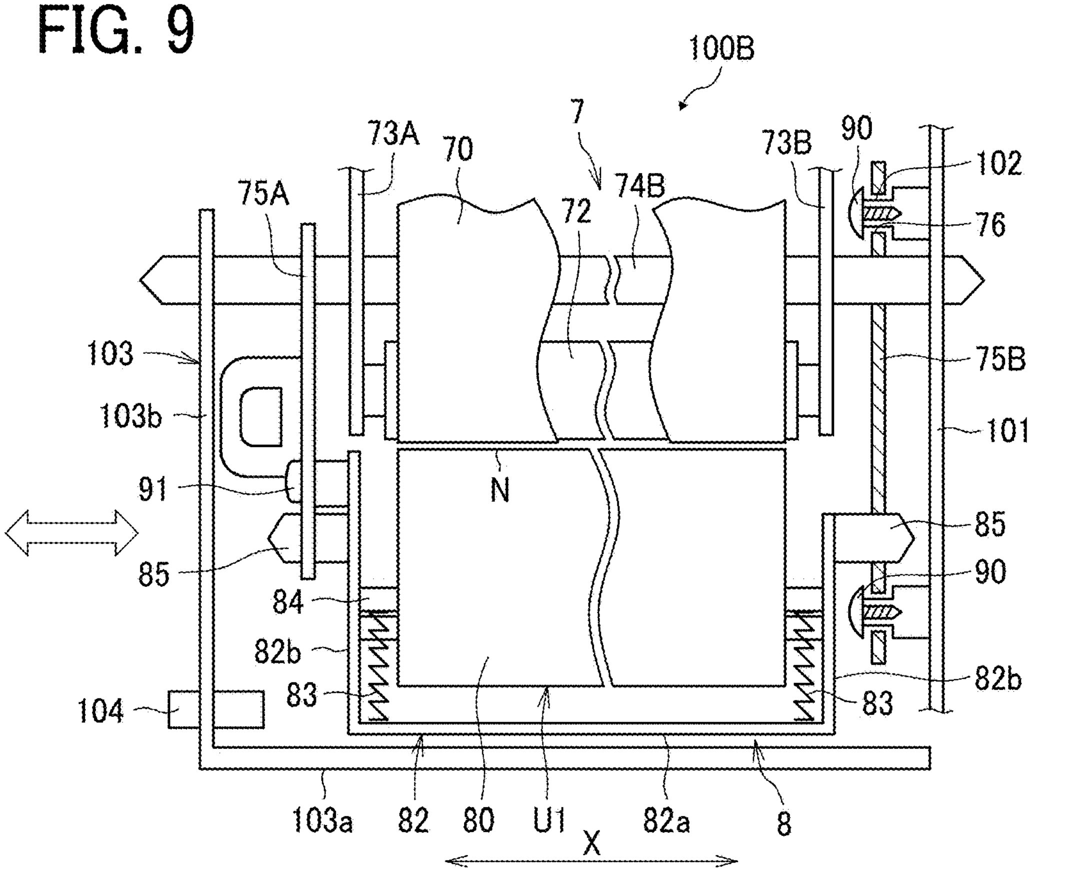
FIG. 9 is a diagram of an image forming apparatus according to a third embodiment of the present disclosure, illustrating the intermediate transfer device and the secondary transfer device incorporated therein, seen from the upstream position upstream from the secondary transfer nip in the recording medium conveyance direction.

FIG. 9 is a diagram of an image forming apparatus 100B incorporating the intermediate transfer device 7 and the secondary transfer device 8 according to a third embodiment of the present disclosure, seen from the upstream position upstream from the secondary transfer nip N in the sheet conveyance direction Y in which the sheet P is conveyed.

The intermediate transfer device 7 according to the third embodiment illustrated in FIG. 9 is provided with a penetrating shaft 74B. The image forming apparatus 100B includes a drawer 103. In addition to the pair of frames 73A and 73B, the front plate 75A, and the rear plate 75B, the penetrating shaft 74B also penetrates through the rear body plate 101 that constructs the body 105 of the image forming apparatus 100B and the drawer 103 that is drawn from the body 105 of the image forming apparatus 100B.

The drawer 103 holds the secondary transfer device 8 and draws the secondary transfer device 8 from the body 105 of the image forming apparatus 100B leftward in FIG. 9. As one example, as illustrated in FIG. 9, the drawer 103 includes a bottom face 103*a* and a side face 103*b* that extends upward from the bottom face 103*a*. The bottom face 103*a* is disposed below the secondary transfer device 8 in FIG. 9. The side face 103*b* is disposed opposite the rear body plate 101 via the secondary transfer device 8 and disposed at a front of the image forming apparatus 100B. The side face 103*b* is attached to the penetrating shaft 74B such that the side face 103*b* slides over the penetrating shaft 74B in an axial direction thereof.

As the operator draws the drawer 103 such that the drawer 103 slides over the penetrating shaft 74B, the drawer 103 draws the secondary transfer device 8. In a state in which the drawer 103 is housed inside the body 105 of the image forming apparatus 100B as illustrated in FIG. 9, the drawer 103 engages an engagement 104 that is a pin mounted on a frame of the body 105 of the image forming apparatus 100B. Thus, the engagement 104 restricts displacement of the drawer 103 with respect to the body 105 of the image forming apparatus 100B in an orthogonal direction perpendicular to an open direction (e.g., a drawing direction) in which the operator opens the drawer 103 and a close direction in which the operator closes the drawer 103. The open direction and the close direction are parallel to the width direction X of the sheet P. For example, in a state in which the drawer 103 is housed inside the body 105 of the image forming apparatus 100B, the engagement 104 restricts displacement of the drawer 103 with respect to the frame of the body 105 of the image forming apparatus 100B in a vertical direction and an orthogonal direction perpendicular to a paper surface in FIG. 9, thus positioning the drawer 103.

As described above, according to the third embodiment, since the penetrating shaft 74B penetrates through the drawer 103, the penetrating shaft 74B is supported by the frame of the body 105 of the image forming apparatus 100B through the drawer 103. For example, the penetrating shaft 74B is supported such that the penetrating shaft 74B is not displaced with respect to the side face 103*b* of the drawer 103 in the vertical direction and the orthogonal direction perpendicular to the paper surface in FIG. 9. The engagement 104 (e.g., the pin) supports the drawer 103 such that the drawer 103 is not displaced in the vertical direction and the orthogonal direction perpendicular to the paper surface in FIG. 9. Accordingly, the frame of the body 105 of the image forming apparatus 100B supports the penetrating shaft 74B through the drawer 103.

The penetrating shaft 74B is also positioned with respect to the rear body plate 101 in the vertical direction and the orthogonal direction perpendicular to the paper surface in FIG. 9. For example, the rear body plate 101 serving as the frame of the body 105 of the image forming apparatus 100B positions and supports the penetrating shaft 74B in an orthogonal direction perpendicular to the axial direction of the penetrating shaft 74B.

As described above, according to the third embodiment, the drawer 103 disposed at one lateral end (e.g., the front) of the image forming apparatus 100B in the width direction X of the sheet P supports the penetrating shaft 74B. Additionally, the rear body plate 101 disposed at another lateral end of the image forming apparatus 100B in the width direction X of the sheet P supports the penetrating shaft 74B. For example, the frame of the body 105 of the image forming apparatus 100B supports the penetrating shaft 74B at one lateral end and another lateral end of the image forming apparatus 100B in the width direction X of the sheet P. Hence, the frame of the body 105 of the image forming apparatus 100B receives a force exerted on the penetrating shaft 74B. Thus, according to the third embodiment, the drawer 103 and the rear body plate 101 prevent the penetrating shaft 74B from being bent downward by a load imposed thereon from the secondary transfer device 8.

The image forming apparatus 100B according to the third embodiment includes the plurality of process units 1Y. 1M, 1C, and 1Bk that is arranged over the intermediate transfer belt 70 horizontally as illustrated in FIG. 1. Hence, the intermediate transfer device 7 is elongated horizontally. Accordingly, the intermediate transfer device 7 is subject to a downward bend due to a weight of the intermediate transfer device 7 and a load imposed from the secondary transfer device 8 at a center portion of the intermediate transfer device 7 in a longitudinal direction thereof. If the intermediate transfer device 7 is bent downward, the intermediate transfer device 7 may not attain proper pressure between the photoconductor 2 and the intermediate transfer belt 70 that contacts the photoconductor 2 and may cause uneven pressure between the photoconductor 2 and the intermediate transfer belt 70.

To address the circumstance, the image forming apparatus 100B according to the third embodiment includes the penetrating shaft 74B that is supported by the frame of the body 105 of the image forming apparatus 100B at one lateral end and another lateral end of the image forming apparatus 100B in the width direction X of the sheet P, thus preventing the penetrating shaft 74B from being bent downward by the load imposed by the secondary transfer device 8. Accordingly, the penetrating shaft 74B suppresses a bend of the center portion of the intermediate transfer device 7 in the longitudinal direction thereof. Consequently, the intermediate transfer device 7 retains proper pressure between the photoconductor 2 and the intermediate transfer belt 70 that contacts the photoconductor 2, thus attaining proper pressure at the primary transfer nip PN.

Figure 10:
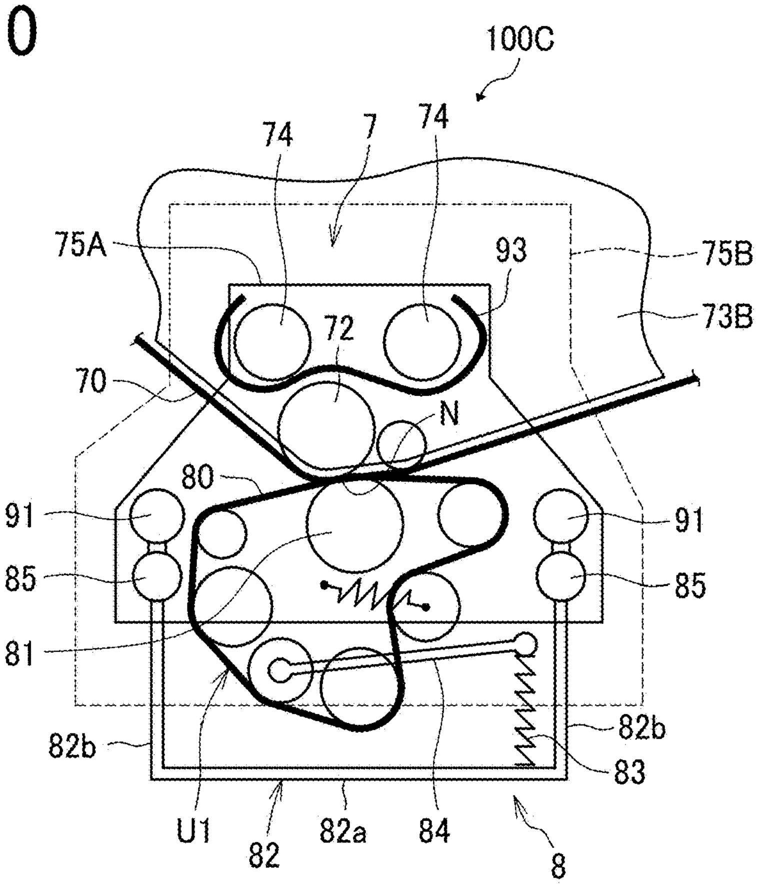
FIG. 10 is a diagram of an image forming apparatus according to a fourth embodiment of the present disclosure, illustrating the intermediate transfer device and the secondary transfer device incorporated therein, seen from one lateral end of the intermediate transfer device and the secondary transfer device in the width direction of the recording medium.

FIG. 10 is a diagram of an image forming apparatus 100C incorporating the intermediate transfer device 7 and the secondary transfer device 8 according to a fourth embodiment of the present disclosure, seen from one lateral end of the image forming apparatus 100C in the width direction X of the sheet P.

The image forming apparatus 100C according to the fourth embodiment illustrated in FIG. 10 includes an insulator 93 that is interposed between each of the penetrating shafts 74 made of metal and the secondary transfer backup roller 72 serving as a conductive roller.

In order to improve rigidity of the secondary transfer device 8 and the intermediate transfer device 7 and suppress deformation of the secondary transfer device 8 and the intermediate transfer device 7 effectively, that is caused by the biasing force from the pressure spring 83, the secondary transfer nip N applied with pressure and each of the penetrating shafts 74 serving as the support shafts preferably define a decreased distance therebetween. However, the secondary transfer backup roller 72 is applied with a voltage and a toner image formed on the intermediate transfer belt 70 is electrostatically transferred onto a sheet P. Hence, if the secondary transfer device 8 and each of the penetrating shafts 74 define the decreased distance therebetween, when the secondary transfer backup roller 72 is applied with the voltage, an electric current may leak to the penetrating shafts 74 that are made of metal and disposed in proximity to the secondary transfer backup roller 72.

To address the circumstance, the image forming apparatus 100C according to the fourth embodiment includes the insulator 93 that is interposed between each of the penetrating shafts 74 made of metal and the secondary transfer backup roller 72 serving as the conductive roller. The insulator 93 prevents the electric current from leaking from the secondary transfer backup roller 72 to the penetrating shafts 74, thus generating a transfer electric field at the secondary transfer nip N properly and preventing faulty transfer of the toner image. Additionally, the penetrating shafts 74 are disposed in proximity to the secondary transfer backup roller 72. Hence, the secondary transfer device 8 and each of the penetrating shafts 74 define the decreased distance therebetween, suppressing deformation of the secondary transfer device 8 and the intermediate transfer device 7 effectively and attaining proper pressure applied at the secondary transfer nip N. For example, the insulator 93 is preferably a resin case or the like that has rigidity to a certain extent and creates a clearance between the insulator 93 and the secondary transfer backup roller 72.

The above describes the embodiments of the present disclosure. However, the technology of the present disclosure is not limited to the embodiments described above and is modified properly within the scope of the present disclosure. For example, two or more of the embodiments described above may be combined properly.

The secondary transfer device 8 may not include the secondary transfer belt 80 unlike the embodiments described above. For example, the secondary transfer roller 81 may contact the intermediate transfer belt 70 directly without the secondary transfer belt 80 interposed therebetween. The secondary transfer device 8 may not be disposed below the intermediate transfer device 7. For example, the secondary transfer device 8 may be arranged with the intermediate transfer device 7 horizontally in a lateral direction or may be disposed above the intermediate transfer device 7.

In view of the embodiments of the present disclosure described above, the technology of the present disclosure encompasses an image forming apparatus (e.g., the image forming apparatuses 100, 100A, 100B, and 100C) having at least one of configurations described below.

A description is provided of a first configuration of the image forming apparatus.

As illustrated in FIGS. 1 and 2, the image forming apparatus includes a photoconductor (e.g., the photoconductor 2), an intermediate transfer device (e.g., the intermediate transfer device 7), a secondary transfer device (e.g., the secondary transfer device 8), and a support shaft (e.g., the penetrating shafts 74, 74A, and 74B).

The photoconductor bears an image. The intermediate transfer device forms a primary transfer nip (e.g., the primary transfer nip PN) between the photoconductor and the intermediate transfer device. The intermediate transfer device primarily transfers the image from the photoconductor onto the intermediate transfer device at the primary transfer nip. The secondary transfer device forms a secondary transfer nip (e.g., the secondary transfer nip N) between the intermediate transfer device and the secondary transfer device. The secondary transfer device secondarily transfers the image from the intermediate transfer device onto a recording medium (e.g., the sheet P) at the secondary transfer nip. As illustrated in FIG. 3, the support shaft has an identical axis and supports the intermediate transfer device. The support shaft supports, on the identical axis, the secondary transfer device at one lateral end and another lateral end, that is opposite to the one lateral end, of the secondary transfer device in a width direction (e.g., the width direction X) of the recording medium, that is perpendicular to a recording medium conveyance direction (e.g., the sheet conveyance direction Y) in which the recording medium is conveyed through the secondary transfer nip.

A description is provided of a second configuration of the image forming apparatus.

With the first configuration of the image forming apparatus, the support shaft having the identical axis is a penetrating shaft that is linear and penetrates through the intermediate transfer device. At least two support shafts (e.g., the penetrating shafts 74, 74A, and 74B) support the secondary transfer device. For example, the at least two support shafts include a first support shaft that is linear and penetrates through the intermediate transfer device and a second support shaft that is linear and penetrates through the intermediate transfer device.

A description is provided of a third configuration of the image forming apparatus.

With the first configuration or the second configuration of the image forming apparatus, as illustrated in FIGS. 3, 4, and 5, the image forming apparatus further includes a first coupler (e.g., the front plate 75A) through which the secondary transfer device is coupled with the first support shaft and the second support shaft and a second coupler (e.g., the rear plate 75B) through which the secondary transfer device is coupled with the first support shaft and the second support shaft. The image forming apparatus further includes a first coupled portion (e.g., the positioning projection 85 and the securing member 91) mounted on the secondary transfer device and coupled with the first coupler and a second coupled portion (e.g., the positioning projection 85 and the securing member 91) mounted on the secondary transfer device and coupled with the second coupler. The first support shaft and the second support shaft define a first straight line (e.g., the straight line S1). The first coupled portion and the second coupled portion define a second straight line (e.g., the straight line S2). The first support shaft and the first coupled portion define a third straight line (e.g., the straight line S3). The second support shaft and the second coupled portion define a fourth straight line (e.g., the straight line S3). The first straight line, the second straight line, the third straight line, and the fourth straight line define a hypothetical frame (e.g., the hypothetical frames F1 and F2) within which the secondary transfer nip is disposed when seen from one lateral end or another lateral end of the intermediate transfer device and the secondary transfer device in the width direction of the recording medium.

A description is provided of a fourth configuration of the image forming apparatus.

With the first configuration or the second configuration of the image forming apparatus, as illustrated in FIGS. 3, 6, and 7, the secondary transfer device is coupled with the first support shaft and the second support shaft through the first coupler. The secondary transfer device is coupled with the first support shaft and the second support shaft through the second coupler. The first support shaft and the second support shaft define the first straight line. The first coupled portion and the second coupled portion define the second straight line. The first support shaft defines a first vertical line (e.g., the straight line S6) that extends downward from the first support shaft in a vertical direction. The first support shaft may define a first orthogonal line (e.g., the straight line S6) that extends in an orthogonal direction perpendicular to the width direction of the recording medium. The second support shaft defines a second vertical line (e.g., the straight line S6) that extends downward from the second support shaft in the vertical direction. The second support shaft may define a second orthogonal line (e.g., the straight line S6) that extends in the orthogonal direction perpendicular to the width direction of the recording medium. The first straight line, the second straight line, the first vertical line or the first orthogonal line, and the second vertical line or the second orthogonal line define a hypothetical frame (e.g., the hypothetical frames F3 and F4) within which the secondary transfer nip is disposed when seen from one lateral end or another lateral end of the intermediate transfer device and the secondary transfer device in the width direction of the recording medium.

A description is provided of a fifth configuration of the image forming apparatus.

With any one of the first configuration to the fourth configuration of the image forming apparatus, as illustrated in FIG. 8, the support shaft includes a first support portion (e.g., the lateral end portion 74*b*) disposed at one lateral end of the support shaft in the width direction of the recording medium, a second support portion (e.g., the lateral end portion 74*b*) disposed at another lateral end of the support shaft in the width direction of the recording medium, and an intermediate portion (e.g., the center portion 74*c*) interposed between the first support portion and the second support portion in the width direction of the recording medium. The first support portion and the second support portion support the secondary transfer device. The intermediate portion is thicker than each of the first support portion and the second support portion. For example, the intermediate portion has a diameter (e.g., the diameter D1) that is greater than a diameter (e.g., the diameter D2) of each of the first support portion and the second support portion.

A description is provided of a sixth configuration of the image forming apparatus.

With any one of the first configuration to the fifth configuration of the image forming apparatus, as illustrated in FIGS. 1 and 3, the image forming apparatus further includes a body (e.g., the body 105) including a frame (e.g., the rear body plate 101) that supports the support shaft.

A description is provided of a seventh configuration of the image forming apparatus.

With any one of the first configuration to the fifth configuration of the image forming apparatus, as illustrated in FIG. 9, the body of the image forming apparatus accommodates a drawer (e.g., the drawer 103) that supports the secondary transfer device and draws the secondary transfer device from the frame of the body of the image forming apparatus. The frame supports the support shaft through the drawer.

A description is provided of an eighth configuration of the image forming apparatus.

With any one of the first configuration to the seventh configuration of the image forming apparatus, as illustrated in FIG. 10, the intermediate transfer device includes a conductive roller (e.g., the secondary transfer backup roller 72) that generates a transfer electric field at the secondary transfer nip and an insulator (e.g., the insulator 93) that is interposed between the conductive roller and the support shaft.

Accordingly, the image forming apparatus suppresses uneven pressure at the secondary transfer nip.

The above-described embodiments are illustrative and do not limit the present invention. Thus, numerous additional modifications and variations are possible in light of the above teachings. For example, elements and/or features of different illustrative embodiments may be combined with each other and/or substituted for each other within the scope of the present invention.

The invention claimed is:

1. An image forming apparatus comprising:

a photoconductor to bear an image;

an intermediate transferer to form a primary transfer nip between the photoconductor and the intermediate transferer, the intermediate transferer to transfer the image primarily from the photoconductor onto the intermediate transferer at the primary transfer nip;

a secondary transferer to form a secondary transfer nip between the intermediate transferer and the secondary transferer, the secondary transferer to transfer the image secondarily from the intermediate transferer onto a recording medium at the secondary transfer nip;

a first side plate on one side of the intermediate transferer;

a second side plate on another side of the intermediate transferer, the first side plate and the second side plate being parallel to each other and on opposite sides of the intermediate transferer; and at least one support shaft supporting the intermediate transferer, the at least one support shaft supporting, on an identical axis, one lateral end and another lateral end of the secondary transferer in a width direction of the recording medium, the width direction perpendicular to a recording medium conveyance direction in which the recording medium is conveyed through the secondary transfer nip, the at least one support shaft penetrating both the first side plate and the second side plate and being perpendicular to the first side plate and the second side plate.

2. The image forming apparatus according to claim 1, wherein the at least one support shaft includes:

a first support shaft that is linear and penetrates through the intermediate transferer; and a second support shaft that is linear and penetrates through the intermediate transferer.

3. The image forming apparatus according to claim 2, further comprising:

a first coupler through which the secondary transferer is coupled with the first support shaft and the second support shaft; and a second coupler through which the secondary transferer is coupled with the first support shaft and the second support shaft.

4. The image forming apparatus according to claim 3, wherein each of the first coupler and the second coupler includes a plate.

5. The image forming apparatus according to claim 3, further comprising:

a first coupled portion mounted on the secondary transferer and coupled with the first coupler; and a second coupled portion mounted on the secondary transferer and coupled with the second coupler.

6. The image forming apparatus according to claim 5, wherein the first support shaft and the second support shaft define a first straight line, wherein the first coupled portion and the second coupled portion define a second straight line, wherein the first support shaft and the first coupled portion define a third straight line, wherein the second support shaft and the second coupled portion define a fourth straight line, and wherein the first straight line, the second straight line, the third straight line, and the fourth straight line define a hypothetical frame within which the secondary transfer nip is disposed when seen in the width direction of the recording medium.

7. The image forming apparatus according to claim 6, wherein the hypothetical frame is trapezoidal.

8. The image forming apparatus according to claim 5, wherein the first support shaft and the second support shaft define a first straight line, wherein the first coupled portion and the second coupled portion define a second straight line, wherein the first support shaft defines a first orthogonal line that extends from the first support shaft in an orthogonal direction perpendicular to the width direction of the recording medium, wherein the second support shaft defines a second orthogonal line that extends from the second support shaft in the orthogonal direction perpendicular to the width direction of the recording medium, and wherein the first straight line, the second straight line, the first orthogonal line, and the second orthogonal line define a hypothetical frame within which the secondary transfer nip is disposed when seen in the width direction of the recording medium.

9. The image forming apparatus according to claim 8, wherein the hypothetical frame is rectangular.

10. The image forming apparatus according to claim 1, further comprising a frame supporting the at least one support shaft.

11. The image forming apparatus according to claim 10, further comprising a drawer to support the secondary transferer and draw the secondary transferer from the frame, wherein the frame supports the at least one support shaft through the drawer.

12. The image forming apparatus according to claim 1, wherein the intermediate transferer includes:

a conductive roller to generate a transfer electric field at the secondary transfer nip; and an insulator interposed between the conductive roller and the at least one support shaft.

13. An image forming apparatus, comprising:

a photoconductor to bear an image;

an intermediate transferer to form a primary transfer nip between the photoconductor and the intermediate transferer, the intermediate transferer to transfer the image primarily from the photoconductor onto the intermediate transferer at the primary transfer nip;

a secondary transferer to form a secondary transfer nip between the intermediate transferer and the secondary transferer, the secondary transferer to transfer the image secondarily from the intermediate transferer onto a recording medium at the secondary transfer nip; and at least one support shaft supporting the intermediate transferer, the at least one support shaft supporting, on an identical axis, one lateral end and another lateral end of the secondary transferer in a width direction of the recording medium, the width direction perpendicular to a recording medium conveyance direction in which the recording medium is conveyed through the secondary transfer nip, wherein the at least one support shaft includes:

a first support portion disposed at one lateral end of the at least one support shaft in the width direction of the recording medium, the first support portion supporting the secondary transferer;

a second support portion disposed at another lateral end of the at least one support shaft in the width direction of the recording medium, the second support portion supporting the secondary transferer; and an intermediate portion interposed between the first support portion and the second support portion in the width direction of the recording medium, and wherein the intermediate portion has a diameter that is greater than a diameter of each of the first support portion and the second support portion.

14. An image forming apparatus, comprising:

a photoconductor to bear an image;

an intermediate transferer to form a primary transfer nip between the photoconductor and the intermediate transferer, the intermediate transferer to transfer the image primarily from the photoconductor onto the intermediate transferer at the primary transfer nip;

a secondary transferer to form a secondary transfer nip between the intermediate transferer and the secondary transferer, the secondary transferer to transfer the image secondarily from the intermediate transferer onto a recording medium at the secondary transfer nip; and at least one support shaft supporting the intermediate transferer, the at least one support shaft supporting, on an identical axis, one lateral end and another lateral end of the secondary transferer in a width direction of the recording medium, the width direction perpendicular to a recording medium conveyance direction in which the recording medium is conveyed through the secondary transfer nip, wherein the secondary transferer includes:

a base having a bottom face;

a first pressure spring anchored to the bottom face at one lateral end of the base in the width direction of the recording medium; and a second pressure spring anchored to the bottom face at another lateral end of the base in the width direction of the recording medium, and wherein a first distance from a first support position at which the at least one support shaft supports the secondary transferer to a first exertion position at which the bottom face is exerted with a biasing force from the first pressure spring equals to a second distance from a second support position at which the at least one support shaft supports the secondary transferer to a second exertion position at which the bottom face is exerted with a biasing force from the second pressure spring in an orthogonal direction perpendicular to the width direction of the recording medium.

* * * * *